June 23, 1936. O. BUSH 2,045,176
ANIMAL GRADING DEVICE
Filed Aug. 4, 1931 2 Sheets-Sheet 1
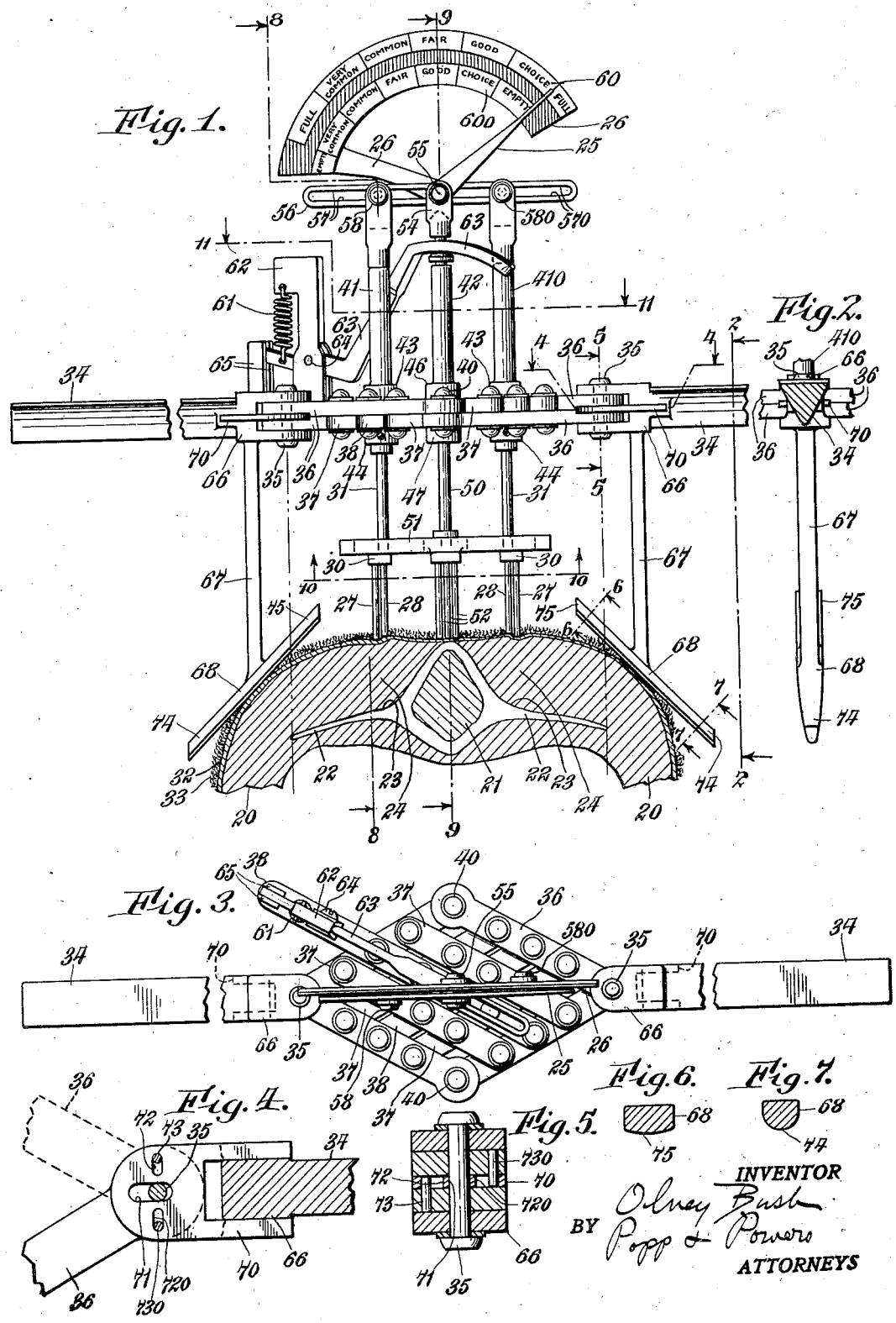

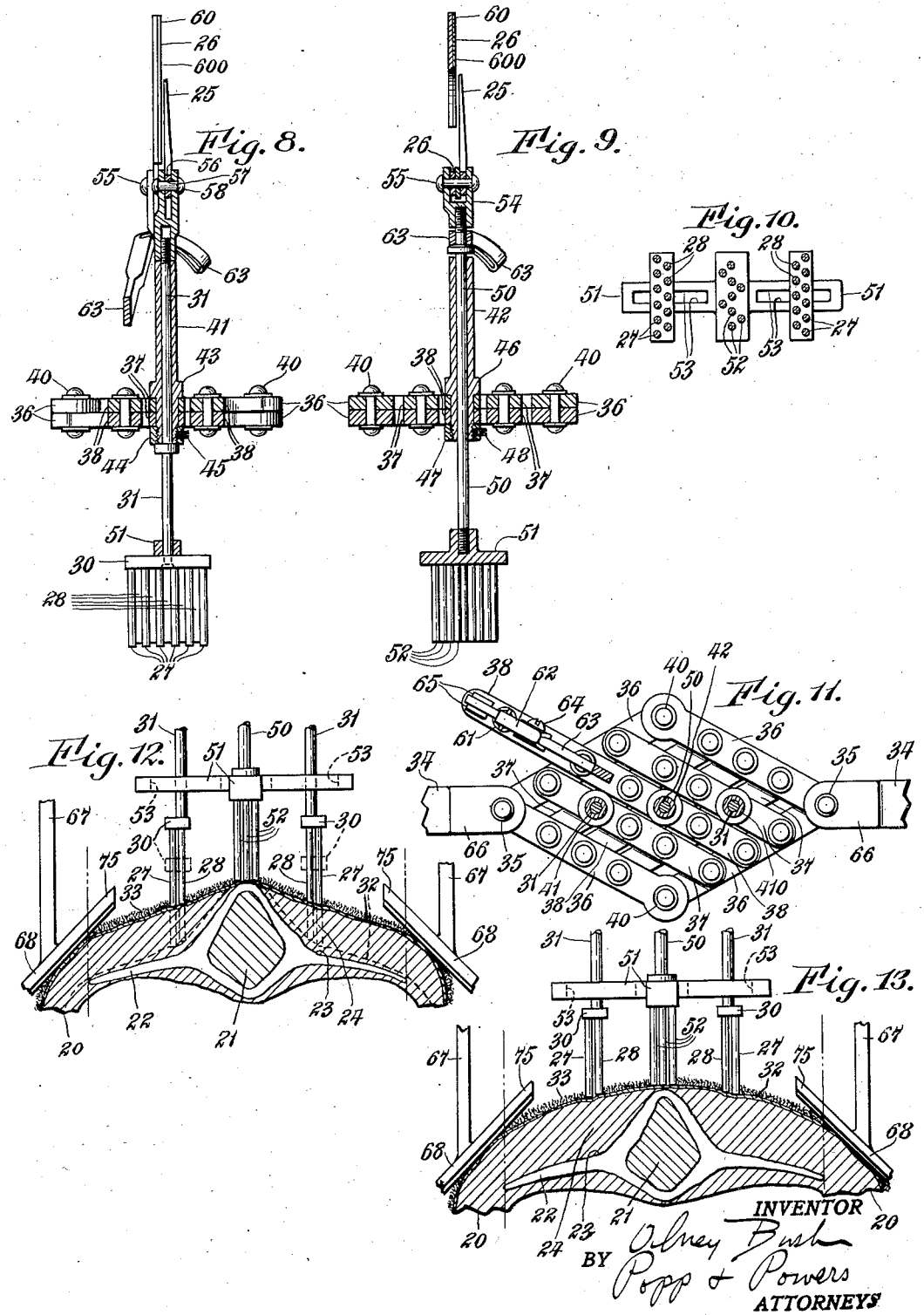

Patented June 23, 1936

2,045,176

UNITED STATES PATENT OFFICE 2,045,176

ANIMAL GRADING DEVICE

Olney Bush, Buffalo, N. Y.

Application August 4, 1931, Serial No. 555,029

15 Claims. (Cl. 33—172)

This invention relates to a device for determining the condition or grade of animals, and particularly relates to a means of determining the degree of fleshiness and fatness of different sizes and proportions of sheep.

The principal object of the invention is to eliminate the personal equation in animal grading and to substitute therefor a definite and accurate mechanical instrument or apparatus for grading animals according to a fixed and precise standard. Numerous subsidiary objects of the invention and practical solutions thereof are disclosed in detail in the herein patent specification wherein:

In the accompanying drawings,—

Figure 1 is a front elevation of the animal grading device constituting the present invention.

Figure 2 is a vertical transverse section thereof taken on line 2—2, Fig. 1.

Figure 3 is a top plan of the invention.

Figure 4 is an enlarged fragmentary, horizontal section thereof taken on line 4—4, Fig. 1.

Figure 5 is an enlarged, vertical, transverse section thereof taken on line 5—5, Fig. 1.

Figures 6 and 7 are enlarged, transverse sections through the proportioning saddle taken on correspondingly numbered lines of Fig. 1.

Figures 8 and 9 are vertical, transverse sections of the grading device taken on correspondingly numbered lines of Fig. 1.

Figures 10 and 11 are horizontal sections thereof taken on correspondingly numbered lines of Fig. 1.

Figures 12 and 13 are fragmentary, front elevations similar to Fig. 1 but showing the grading device in use with different grades of animals.

In the following description similar characters of reference indicate like parts in the several figures of the drawings.

My invention may be embodied in various forms and in animal grading devices of different constructions, and the present application is therefore to be regarded merely as one organization which satisfactorily carries out the invention in practice. As here shown, the same is constructed as follows:

In Fig. 1 is shown a vertical, transverse section through a sheep 20, said section being taken through what is termed the loin of the sheep. Such a section discloses one of the loin or small-of-the-back vertebrae 21 of the sheep to which is integrally attached a pair of floating ribs 22. Where the vertebra 21 of the sheep integrally joins its companion pair of floating ribs 22 is formed a hollow or cavity 23. When this cavity is so well filled up with meat and fat 24 as that shown in Fig. 1, such an animal is entitled to the rating of "choice" (as indicated by the indicator hand 25 upon the scale 26). The present invention concerns itself more particularly with the determination of the amount of this meat and fat 24 in said cavity 23, it being maintained that to do this accurately and for animals of all sizes constitutes the proper basis for grading animals, especially where said animals are grown particularly for the production of meat.

Adapted to rest directly upon the flesh of the animal and directly over said cavity 23 upon each side of the backbone 21 of the animal, are a plurality of vertical gauge fingers consisting of a row or set of supporting gauge fingers 27 and a row or set of determining gauge fingers 28, the latter being somewhat shorter than the former. Both sets of these gauge fingers extend downwardly from and are secured to a companion gauge finger block 30 (see Figs. 1, 8, 10, 12 and 13) which is rivetted to or otherwise firmly secured to the lower end of a pair of gauge rods 31.

The object in having the gauge fingers 27 and 28 of unequal length is as follows: It is the desire to rest substantially the entire weight of the whole animal gauging device upon the gauge rods 31. Such a pressure naturally causes the supporting gauge fingers 27 to sink below the normal surface of the skin 32 of the animal. The determining gauge fingers 28, however, being shorter, do not sink below the normal surface of the skin 32 but have their lower ends disposed flush with said normal outer skin surface when the constant weight of the entire instrument is imposed upon aforesaid supporting gauge fingers 27. Whether, in any given case, such a result is actually obtained can be readily verified, usually, by looking to see whether the lower ends of said determining gauge fingers 27 are actually flush with the outer surface of the animal's skin 32. The purpose of providing a plurality of relatively small gauging fingers 27 and 28 is so that the same may be wiggled slightly from one side to the other when being applied so as to work down through the hair 33 of the animal so that a proper grading of the animal's carcass may be obtained irrespective of how much hair or wool 33 it may happen to have at the time of the grading and without causing an excessive amount of pressure on the skin of the animal.

The main frame of the grading device is constituted of a pair of horizontal, transverse handles 34 which are preferably of triangular form as shown in Fig. 2 so as to facilitate their manual manipulation by the operator using the device. Pivotally connected at 35 to the inner ends of said handles 34 (see Figs. 1, 3 and 11) is a folding latticework constituting a ratioing frame or lazy tong arrangement consisting of the outer lazy tong levers 36, intermediate levers 37 and central levers 38. The outer levers are pivoted to each other at their outer ends and to aforesaid handles 34 at 35 and are medially pivoted together at 40. Each of the various lazy tong levers 36, 37 and 38 are pivoted to each other at every medial intersection of any one lever with any other lever which it overlies or underlies. Each of these pivotal connections constitutes a "ratioing" pivot center, inasmuch as the geometric distances between all of them remain constant in ratio relatively to each other irrespective of how much the lazy tongs is expanded or contracted. All of these pivotal connections consist of rivets (in the particular construction illustrated) with the exception of those particular medial intersections which are coaxially in line with the two gauging, upright, tubular standards 41 and 410 and the central indicator, upright, tubular standard 42. The latter is at all times equidistant from the handle pivots 35 as the latter are moved toward or away from each other. During this movement the ratio of the distance between the indicator standard 42 and the gauging standards 41, 410 relatively to the distance from said gauging standards 41, 410 to the handle pivots 35 is at all times a constant quantity. This is the reason for terming the lazy tong arrangement a "ratioing frame". The reason for this arrangement will appear hereinafter.

The gauging rods 31 are threaded at their upper ends (see Fig. 8) into the tubular upright gauge standards 41 and 410. The latter are provided with integral collars 43 which rest upon the upper, intermediate, lazy tong levers 37 and have threaded onto their lower ends the nuts 44 (held by set screws 45) which bear against the bottom faces of the lower, intermediate, lazy tong levers 37. Thus the said intermediate lazy tong levers 37 are free to rotate about said gauging standards 41, 410 as pivots and yet said standards and also the gauging rods 31 are constrained against vertical movement relatively to the lazy tongs.

The upright, tubular, indicator standard 42 (see Fig. 9) is connected to the lazy tongs in a manner similarly to the gauging standards 41, 410, being provided with an integral collar 46 and nut 47, the latter being locked in place by a set screw 48. Thus the central, lazy tong levers 38 are free to rotate about said indicator standard 42 as a pivot but vertical movement of said indicator gauging standard relatively to said lazy tongs is prevented.

Vertically slidable within said upright, tubular, indicator standard 42 is a vertical indicator rod 50 upon the lower end of which is threaded or otherwise secured a brace plate 51. The latter has secured to its central lower face a plurality of longitudinal rows of indicator feelers or reference members 52 which are analogous in their function to the gauging fingers 27 heretofore described. These indicator feelers are adapted to rest directly upon the outer surface of the skin 33 of the animal and directly over the middle of its spinal column 21. The amount of muscle and fat upon the spinal column of an animal is at all times practically nil, or in other words is a constant quantity for all grades (amount of meat and fat) of animals. The amount of meat and fat, however, varies in amount above the cavities 23 and in direct proportion to the grade of the animal. Hence the obtaining of the grades of different animals depends upon the vertical displacement of the gauge fingers 27 relatively to the indicator feelers 52.

To laterally stiffen the lower ends of the gauge rods 31, the brace plate 51 is extended laterally some distance on both sides of the indicator rod 50, suitable vertical transverse slots 53 being formed in said brace plate 51 (see Fig. 10) so as to permit said gauge rods 31 to be moved in and out relatively to said brace plate and said feeler rod 50.

Secured to the upper end of the indicator rod 50 is a clevis 54 in the ears of which is located a horizontal indicator pivot 55. Pivotally mounted on said pivot 55 is the indicator hand 25 to which is integrally connected an arm 56 provided with a slot 57 that is radial with respect to the axis of the pivot 55. Slidably disposed within said slot 57 is a horizontal pin 58 which is arranged in the upper forked end of the one gauge standard 41. Thus said gauge standard 41 is free to move toward and from the feeler standard 50 (in which case the pin 58 slides back or forth in the slot 57) and at the same time any vertical movement of the feeler rod 50 relatively to said gauge standard 41 is transmitted to the indicator hand 25 and causes partial rotation thereof.

The other gauge standard 410 is similarly forked at its upper end and similarly receives a pin 580 which is adapted to slide back and forth in the slot 570 of the indicator 26, the latter being pivotally mounted on the pivot 55 of indicator rod 50. Thus as the indicator bar 50 rises relatively to the standards 41, 410 and their pivots 58 and 580, the indicator hand 25 is partially rotated in a counter-clockwise direction and the dial 26 is rotated an equal angular distance in a clockwise direction. This double movement of indicator hand and dial causes twice the deflection that would occur if only the one or the other were moved, thereby permitting generous units of angular measurement on the scale 26 and permitting readings to be easily made.

In Fig. 1 is shown a "choice" animal, i. e., one which is well supplied with meat and fat. In Fig. 13 is shown an animal which is somewhat less meaty and fat and is in a condition known to stockmen as "good". The full lines of Fig. 12 illustrate a still thinner animal, the condition of which is called "fair". If the animal were somewhat more thin than this, its condition is termed "common", and if it practically nothing but skin and bones as shown by dotted lines in Fig. 12, the animal is graded as "very common". It will be noticed that these five gradings of animal condition are shown in scaled relation on the indicator 26. The scale of five upper gradings 60 is employed when the animal has had a meal shortly before the grading is made, i. e., when the animal is "full", in which case its body is more distended than when it is empty of food and the angular deflection of scale 26 and indicator hand 25 correspondingly affected. In the latter case the lower scale of gradings 600 are employed in determining the condition of the animal.

The indicator rod 50 is at all times resiliently urged downwardly by a tension spring 61, the upper end of which is connected to a stanchion 62 which arises from and is secured to the upper face of one of the central lazy tong levers 38. The lower end of said spring 61 is connected to the outer end of a thrust lever 63 which is received between the lower bifurcated legs of said stanchion and is pivoted thereto at 64. The outermost end of said thrust lever 63 is received between and guided by a pair of upright guide posts 65 which arise from and are secured, by welding or otherwise to, the same central lazy tong lever 38 which carries the stanchion 62. Said guide posts not only prevent distortion of said thrust lever 63 but also prevent accidental forces being imposed thereon which would affect the readings on the scale 26. It is to be remembered that the herein disclosed invention is a portable device and is intended for use by sheep farmers who cannot be expected to handle the same with any great degree of delicacy.

The inner ends of each of the handles 34 terminate in a horizontal clevis 66 to the lower face of which is secured, by welding or otherwise, a vertical, depending proportioning arm 67 to the lower end of which is secured an inclined proportioning saddle 68 (see Figs. 1, 2, 6 and 7). The inclination of this saddle is such that, because of the empirical conditions actually to be encountered in livestock, the pivots 35 will at all times lie perpendicularly directly above the outer ends of the short or floating ribs 22 irrespective of the size of the animal, when the entire instrument is placed symmetrical and crosswise over the loins of an animal and when the gauge fingers 27 are in firm contact with the flesh of the animal and when, furthermore, the handles 34 are pushed toward each other until the proportioning saddles just make firm contact with the flanks of the animal. From a purely abstract point of view there is no reason why the pivots 35 should in all cases lie directly over the ends of the ribs 22, nor is it necessary in the practice of this invention that such a relation be strictly true. The sole aim of the invention is to grade animals, and it is necessary to in some way compensate for variation in the bony structures of animals of various sizes, and the herein method of basing the size of the bony structure upon the length of the floating rib located at the loin of the animal is thought to be as accurate as any.

When the proportioning saddles 68 are moved toward or from each other for different sizes of animals, it is necessary that the gauge fingers 27, 28 be similarly shifted in exact proportion so as to at all times be located perpendicularly directly over the cavities 23. To accomplish this end is the chief function of the lazy tongs or rationing frame which permits both the saddles 68 and said gauge fingers 27, 28 to be laterally shifted to suit the size of the animal and yet at the same time keeping the two in the same relationship with respect to the indicator fingers 52, or, in other words, to the spinal column 21 of the animal. When the grading device is used for grading sheep the distance between the indicating rod 50 and either one of the gauge rods 31 is approximately forty per cent of the distance from said indicating rod 50 to the vertical line passing through the axis of the pivot pin 35 to the outer extremities of the floating rib 22.

As to the amount of meat and fat 20 above the cavity 23 of the animal, it has been found, by actual observation, that, as the animal puts on weight, (increases its grading) the slope of the skin 32 swings upwardly about the top of the spine 21 as a pivot and that the differences between successive grades of animals subtend equal angular displacements as measured between successive radii having as a common center, the top of said spine 21. It is against these different theoretical radii that the gauging fingers 27, 28 are in contact, and as they are subtended by equal arcs, it follows that the gradings on the scale 26 may also denote measures of equal angular intervals.

It is desirable that the two handles 34 be always maintained in one straight line and that the lazy tongs be kept symmetrical therewith. To obtain this result (see Figs. 4, 5, 1 and 3) the clevis of each of said handles 34, (to which are pivoted at 35 the outer lazy tong levers 36) is horizontally straddled by a sliding head 70 provided with a central, longitudinal slot 71 which receives aforesaid pivot pin 35. Formed transversely and radially of said slot 71 are a pair of guide holes 72, 720 the former of which receives a pin 73 secured to one of the outer lazy tong levers 36, while the other guide hole 720 receives a pin 730 secured to the companion other outer lazy tong lever 36. Thus as the lazy tongs are opened or closed and the outer lazy tong levers 36 opened or close accordingly, the pins 73 and 730 are compelled to maintain an alignment perpendicular to the axis of the handles 34, while the sliding head 70 is free to slide back or forth to accommodate itself to the radial swing of said pins about their center or rotation, namely pivot 35.

*Operation*

The operator grasps the grading device by means of its two handles 34 and drops the indicator feelers 52 upon the spine 21 of the animal in the region of the loins, the lower tapered part 74 of the proportioning saddles 68 being lightly in contact with the flanks of the animal. He then lets the weight of the grading device fall upon the gauge fingers 27, 28 and at the same time wiggles the grading device back and forth so as to cause both the indicator feelers 52 and the gauge fingers 27, 28 to penetrate through the wool or hair of the animal and come in direct contact with the animal's flesh. While this is being effected the handles 34 are drawn apart until the upper part 75 of the proportioning saddles 68 are in direct contact with the skin of the animal. It should be noted that the lower part 74 of each saddle 68 is not only tapered but that its lower inner face has a small radius of curvature (Fig. 7). This causes the hair of the animal to be parted or separated so that when the handles 34 are drawn apart still more so as to have the upper part 75 of said saddle only making light contact with the skin of the animal, the hair has already been parted to allow of a direct contact with the skin of the animal even though the bottom face of this upper part 75 of each saddle has a relatively large radius of curvature (Fig. 6). The pivots 35 are now directly over the ends of the one floating rib 22 (at the loin of the animal) and the determining fingers 28 have their lower ends flush with the outer surface of the animal's skin 32. The grading of the animal is now determined by the relative vertical positions of the gauge fingers 27, 28 and the feeler fingers 52, this position denoting the amount of meat and fat 24 lying above the cavity 23. This amount is registered on the scale 26. If the animal has just eaten, the upper gradings 60 ("full" scale) are used, while if the animal is empty the lower gradings 600 ("empty" scale) are used. Angularly considered, there is a difference of one grade between the "full" and the "empty" scale, i. e., if an animal is distended and registers a grade of good when full of food, another animal giving the same scale reading but empty of food would have a grading of choice. The operator can easily use his judgment in calibrating the differences in all intermediate cases.

When the flesh of an animal is soft and flabby, the gauge fingers 27, 28 will sink more deeply than they would in the same animal were the flesh to be hard and firm. This condition of affairs is also registered on the scale 26 of the herein invention because the lower the relative position of said grading fingers 27, 28, the lower the grading of the animal. In this manner the grading device is enabled to measure quality of flesh as well as the degree to which the animal is filled out with flesh.

In the illustrations it has been assumed that the animals to be graded are sheep. It is, however, obvious that other animals can be similarly graded although the size of the device and its relative proportions, weight, etc. as well as its point of application would vary for different animals. In grading chickens, for instance, it is well known that it is the amount and quality of the flesh on the breast of the chicken and the suppleness of its central rib cartilage that determines its grade. Accordingly, in grading a chicken, the device would be applied to its breast and the size proportions, etc. of the device would have to be varied accordingly.

The present inventor is the first, as far as he is aware, to devise a mechanical instrument or apparatus for grading animals other than on the basis of mere weight and he believes, therefore, that it is only proper that the scope of the present invention broadly dominate, during the life of the patent all devices for mechanically grading all kinds of animals except on the basis of mere weight and except, of course, as to the measurement of contours per se.

I claim:

1. An animal grading device adapted to determine the amount and quality of meat on the skeleton of a live animal and comprising a frame constructed in the form of a lazy tongs having a plurality of pivot centers; a proportioning saddle connected with one of the pivot centers of said lazy tong frame and adapted to be positioned in accordance with the variable proportions of the bony structures of different sized animals; and a gauge finger connected to another pivot of said lazy tong frame and adapted to make contact with a portion of the animal being graded.

2. An animal grading device adapted to determine the amount and quality of meat on the skeleton of a live animal and comprising a frame constructed in the form of a lazy tongs having a plurality of pivot centers; a proportioning saddle connected with one of the pivot centers of said lazy tong frame and adapted to be positioned in accordance with the variable proportions of the bony structures of different sized animals; a gauge finger connected to another pivot of said lazy tong frame and adapted to make contact with a portion of the animal being graded; an indicator feeler connected to said frame without being affected by its lazy tong movement; and an indicator adapted to register the relative positions of said feeler and said finger.

3. An animal grading device adapted to determine the amount and quality of meat on the skeleton of a live animal and comprising a frame; means for locating said frame relatively to the animal; a supporting gauge finger connected with said frame and adapted to rest upon a portion of the animal; a determining gauge finger also connected with said frame and adapted to only make contact with another portion of the animal; an indicator feeler also connected with said frame and adapted to make contact with still another but definite portion of the animal; and an indicator mounted on said frame adapted to register the relative positions of said feeler and said determining gauge finger.

4. An animal grading device adapted to determine the amount and quality of meat on the skeleton of a live animal and comprising a frame constructed of lazy tongs and having a longitudinal operating handle lying in the same horizontal plane as said lazy tongs; means for centering said handle with respect to the horizontal, longitudinal axis of said lazy tongs; means for locating said frame with respect to the animal; an indicator feeler movably mounted on said frame and adapted to contact with a portion of the animal; and an indicator adapted to register the relative position of said feeler and said frame.

5. An animal grading device comprising: a reference member adapted to be horizontallly disposed in specific relation to one certain part of an animal; a gauge finger mounted for movement horizontally toward and from said reference member so as to be in vertical alignment with another certain part of said animal and also adapted to be moved vertically relatively to said reference member and to make vertical contact with said certain other part of said animal; and an indicator movably connected with said reference member and said gauge finger and adapted to register their vertical positions relatively to each other and to thereby register the amount of meat on the skeleton of the animal.

6. An animal grading device comprising: a reference member adapted to be disposed in specific relation to one certain part of an animal; a proportioning saddle movably connected with said reference member and adapted to be moved to a position which is in accordance with the size of said animal; a gauge finger movably connected with said reference member and adapted to make contact with another certain part of said animal and to be displaced relatively to said reference member in proportion to the distance of said proportioning saddle from said reference member; and an indicator movably connected with said reference member and said gauge finger and adapted to register their positions relatively to each other and to thereby register the amount of meat on the skeleton of the animal.

7. An animal grading device comprising: a reference member adapted to be disposed in specific relation to one certain part of an animal; a proportioning saddle movably connected with said reference member and adapted to be moved to a position which is in accordance with the size of said animal; a gauge finger movably connected with said reference member and adapted to make contact with a fleshy part of said animal and to be displaced relatively to said reference member in proportion to the distance of said proportioning saddle from said reference member; and an indicator movably connected with said reference member and said gauge finger and adapted to register their positions relatively to each other and to thereby register the amount of meat on the skeleton of the animal.

8. An animal grading device comprising: a reference member adapted to be disposed in specific relation to the bony structure of an animal; a proportioning saddle movably connected with said reference member and adapted to be moved to a position which is in accordance with the size of said animal; a gauge finger movably connected with said reference member and adapted to make contact with another certain part of said animal and to be displaced relatively to said reference member in proportion to the distance of said proportioning saddle from said reference member; and an indicator movably connected with said reference member and said gauge finger and adapted to register their positions relatively to each other and to thereby register the amount of meat on the skeleton of the animal.

9. An animal grading device comprising: a reference member adapted to be disposed in specific relation to the bony structure of an animal; a proportioning saddle movably connected with said reference member and adapted to be moved to a position which is in accordance with the size of the bony structure of said animal; a gauge finger movably connected with said reference member and adapted to make contact with a certain fleshy part of said animal and to be displaced relatively to said reference member in proportion to the distance of said proportioning saddle from said reference member; and an indicator movably connected with said reference member and said gauge finger and adapted to measure their position relatively to each other and to thereby register the amount of meat on the skeleton of the animal.

10. An animal grading device comprising: a reference member adapted to be disposed in specific relation to one certain part of an animal; a proportioning saddle horizontally, movably connected with said reference member and adapted to be moved to a horizontal position which is in accordance with the size of said animal; a gauge finger horizontally and vertically movably connected with said reference member and adapted to be horizontally moved away from said reference member a distance proportional to the distance of the proportioning saddle from the reference member and to be vertically moved into contact with another certain part of the animal; and an indicator movably connected with said reference member and said gauge finger and adapted to measure their positions relatively to each other and to thereby register the amount of meat on the skeleton of the animal.

11. An animal grading device comprising: a reference member adapted to be disposed in specific relation to one certain part of the bony structure of an animal; a proportioning saddle horizontally, movably connected with said reference member and adapted to be moved to a horizontal position which is in accordance with the size of the bony structure of said animal; a gauge finger horizontally and vertically movably connected with said reference member and adapted to be horizontally moved away from said reference member a distance proportional to the distance of the proportioning saddle from the reference member and to be vertically moved into contact with another certain part of the animal; and an indicator movably connected with said reference member and said gauge finger and adapted to measure their positions relatively to each other and to thereby register the amount of meat on the skeleton of the animal.

12. An animal grading device comprising: a reference member adapted to be disposed in specific relation to one part of the bony structure of an animal; a proportioning saddle horizontally, movably connected with said reference member and adapted to be moved horizontally into contact with another part of said animal and thereby to a horizontal position which is in accordance with the size of the bony structure of said animal; a gauge finger horizontally and vertically connected with said reference member and adapted to be horizontally moved away from said reference member a distance proportional to the horizontal distance of the proportioning saddle from the reference member and to be vertically moved into contact with still another certain part of the animal; and an indicator movably connected with said reference member and said gauge finger and adapted to measure their vertical positions relatively to each other and to thereby register the amount of meat on the bony structure of the animal.

13. An animal grading device comprising: a reference member adapted to be disposed in specific relation to one part of the bony structure of an animal; and inclined proportioning saddle horizontally, movably connected with said reference member and adapted to be moved horizontally into contact with another part of said animal and thereby to a horizontal position which is in accordance with the size of the bony structure of said animal; a gauge finger horizontally and vertically connected with said reference member and adapted to be horizontally moved away from said reference member a distance proportional to the horizontal distance of the proportioning saddle from the reference member and to be vertically moved into contact with still another certain part of the animal; and an indicator movably connected with said reference member and said gauge finger and adapted to measure their vertical positions relatively to each other and to thereby register the amount of meat on the bony structure of the animal.

14. An animal grading device comprising: a reference member adapted to be disposed in specific relation to one part of the bony structure of an animal; a proportioning saddle having a curved face and horizontally, movably connected with said reference member and adapted to be moved horizontally into contact with another part of said animal and thereby to a horizontal position which is in accordance with the size of the bony structure of said animal; a gauge finger horizontally and vertically connected with said reference member and adapted to be horizontally moved away from said reference member a distance proportional to the horizontal distance of the proportioning saddle from the reference member and to be vertically moved into contact with still another certain part of the animal; and an indicator movably connected with said reference member and said gauge finger and adapted to measure their vertical positions relatively to each other and to thereby register the amount of meat on the bony structure of the animal.

15. An animal grading device comprising: a reference member adapted to be disposed in specific relation to one certain part of an animal; a gauge finger movably connected with said reference member and adapted to make contact with another certain part of said animal; an indicator movably connected with said reference member and said gauge finger and adapted to register their positions relatively to each other and to thereby register the amount of meat on the skeleton of the animal; and a pair of dials on said indicator the one being used when the animal is full of food and the other dial being used when the animal is empty.

OLNEY BUSH.